No. 729,625. PATENTED JUNE 2, 1903.
E. MATHIEU.
CENTRIFUGAL GOVERNOR.
APPLICATION FILED NOV. 4, 1902.
NO MODEL.
2 SHEETS—SHEET 1.

WITNESSES
INVENTOR
Eugene Mathieu
By Richards
ATTORNEYS

No. 729,625.　　　　　　　　　　　　　　　PATENTED JUNE 2, 1903.
E. MATHIEU.
CENTRIFUGAL GOVERNOR.
APPLICATION FILED NOV. 4, 1902.
NO MODEL.　　　　　　　　　　　　　　　　2 SHEETS—SHEET 2.

No. 729,625.

Patented June 2, 1903.

UNITED STATES PATENT OFFICE.

EUGENE MATHIEU, OF LOUVAIN, BELGIUM.

CENTRIFUGAL GOVERNOR.

SPECIFICATION forming part of Letters Patent No. 729,625, dated June 2, 1903.

Application filed November 4, 1902. Serial No. 130,079. (No model.)

*To all whom it may concern:*

Be it known that I, EUGENE MATHIEU, a citizen of the Republic of France, residing at Louvain, in the Kingdom of Belgium, have invented certain new and useful Improvements in Centrifugal Governors, of which the following is a specification.

This invention relates to centrifugal governors, such as are used in combination with explosion-engines, and has for its purpose to secure an apparatus of this kind which will be adapted to operate with an exceptionally-great sensibility and without any objectionable friction.

With this object in view my invention essentially consists in the combination of two disks or washers and of balls located between said disks or washers, one of said disks being adapted to rotate, while the second disk or washer is adapted to be displaced under the action of the centrifugal force developed in the balls rotating with the first disk or washer, the movement of said second disk or washer being used as a means for actuating a clack-valve or any other appropriate controlling device suitably mounted in the gas or mixture inlet pipe of the engine or motor.

In carrying the invention into practice the disks or washers forming part of the governor may be suitably shaped and provided with straight or curved or inclined surfaces adapted to vary the action which is opposed through said washers to the action of the centrifugal force, so as to counterbalance the centrifugal action in a very short time or in any given or predetermined conditions.

Figure 1:
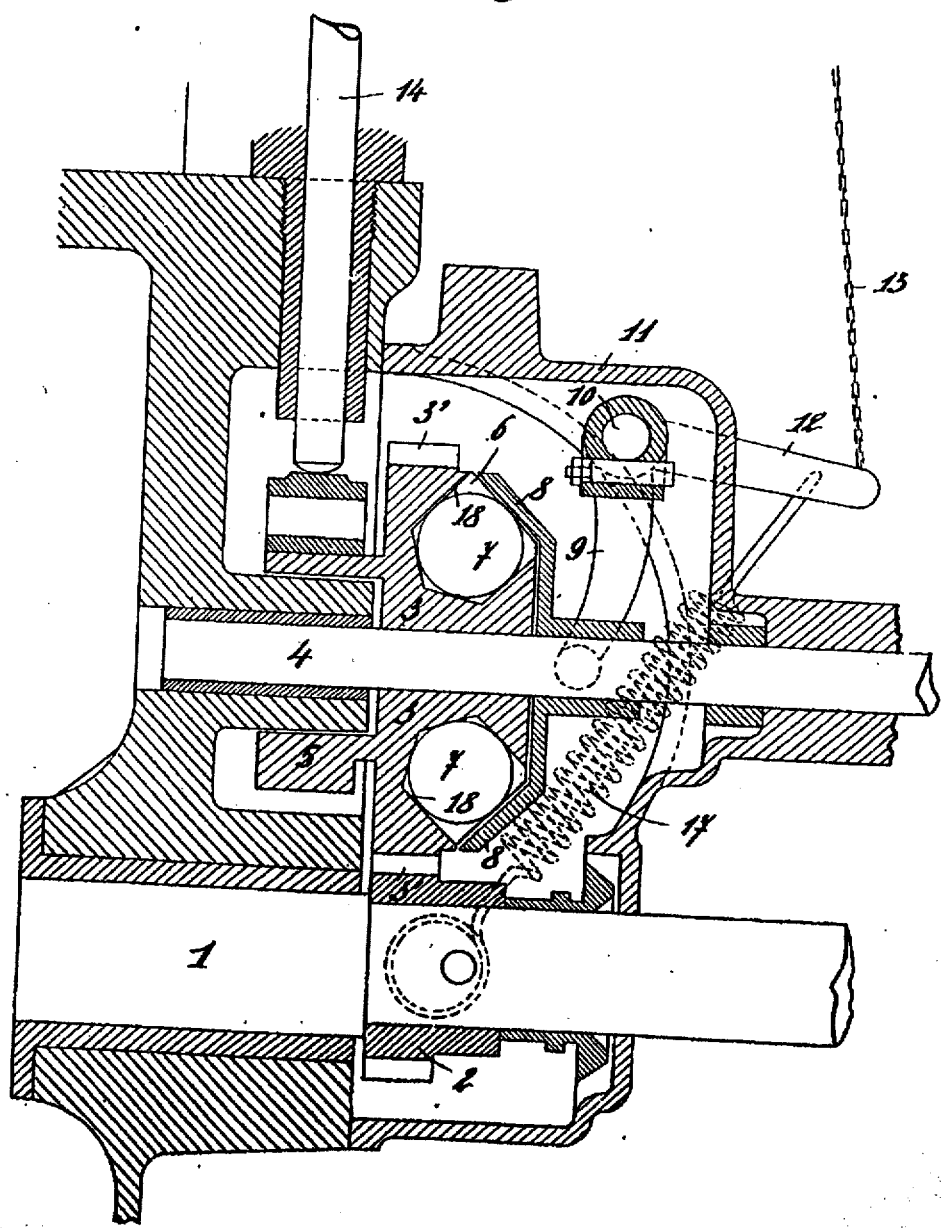
Figure 2:
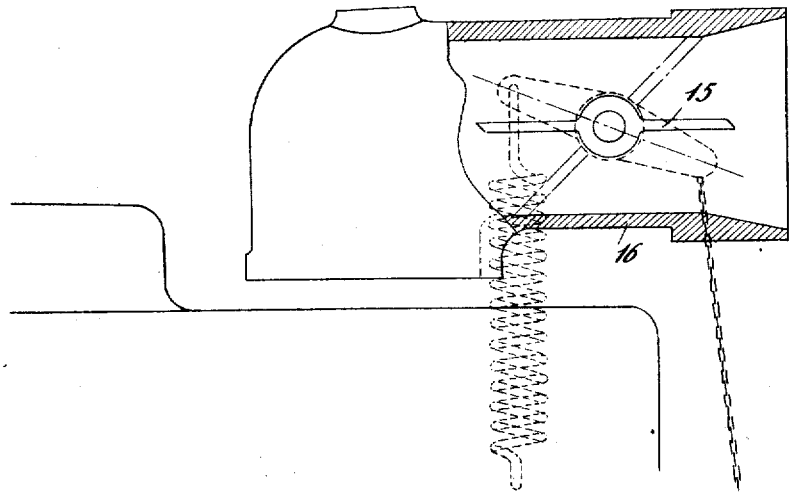

The annexed drawings show, Figures 1 and 2, a vertical section of a centrifugal governor, Fig. 1, constructed according to my invention, the said governor being combined with the clack-valve, Fig. 2, of an explosion-motor.

In the drawings, 1 is the driving-shaft of the motor, actuating through a pinion 2 a washer or disk 3, provided with a toothed periphery 3', the teeth of which engage with the teeth of pinion 2. The washer 3 turns loosely on an auxiliary shaft 4 or may be keyed upon said shaft, which may be used as a cam-shaft for the distribution of the motor. In the construction shown the washer 3 is integral with a cam 5, actuating the rod 14, acting on the inlet-valve of the motor.

The washer 3, which is a part of the governor, is provided with a number of recesses 6, in each of which is placed a ball 7, which is retained in said recess by aid of a second washer or disk 8, loosely mounted on shaft 4 and adapted to be displaced longitudinally upon said shaft and to act during said displacement on a forked lever 9, rocking upon an axle 10, supported by the casing 11 of the governor in a suitable bearing, and fitted outside of the casing 11 with an arm 12, adapted to be connected through a chain 13 or through any suitable connection with a clack-valve 15, interposed in the air or gas or mixture pipe 16, according to the mode of regulation of the engine.

The washer 8 is held in the position shown on the drawings by aid of a spring 17, having one end connected to the arm 12 and its second end connected to a fixed point outside of the casing 11.

The governor thus constructed acts in the following manner: The engine being in operation, the driving-shaft 1 rotates washer 3 by aid of the pinion 2 and of the toothed periphery 3'. The balls 7 are carried along by the washer 3, and owing to the action of the centrifugal force tend to rise along the incline 18 of the recesses 6 and to force back the washer or disk 8 against which they are thrown. As a result of this, simultaneously as the said balls rotate with washer 3 they are rotated in the recesses 6 and cannot produce any objectionable friction or jamming. Owing to the longitudinal displacement of washer 8 upon the shaft 4, the forked lever 9 is oscillated and acts through arm 12 and chain 13 on the clack-valve 15, which, as shown in dotted lines, closes more or less (according to the action of the governor) the section of the pipe 16, through which the gas or explosive mixture may accede to the inlet-valve of the motor.

It will be easily understood that owing to the special combination of the parts or elements of the governor, hereinbefore described, the conditions of operation of the governor may be calculated very easily and without any special difficulty. The curved or inclined surface 18 of the recesses 6 in washer 3, and the curved or inclined surface of washer 8 which both act upon the balls in conjunction with the action of the spring 17 in order to counterbalance the action of the centrifugal force, may be so shaped as to give to the governor a very great sensibility only between two given speeds of revolution of the driving-shaft 1, and it will be understood that I do not confine myself to the exact form or shape of the disks or washers shown in the drawings, said details varying necessarily with the special conditions of operation of each governor.

What I claim is—

1. In a centrifugal governor, the combination with a driving-shaft of a washer rotated by said shaft, balls carried along in the rotation of said washer, a second washer shaped so as to counterbalance the action of the centrifugal force generated in the balls and adapted to be displaced longitudinally by the balls and means for transmitting the movements of said washer, substantially as described.

2. In a centrifugal governor the combination with a driving-shaft of a washer rotated by said shaft, said washer being provided with a number of recesses, a ball in each of said recesses, a second washer mounted loosely on the shaft and maintaining the balls in the said recesses, the said second washer being adapted to be displaced longitudinally on the shaft through the balls when they are displaced in their recesses under the action of the centrifugal force and means transmitting the movement of the said washer, substantially as described.

3. In a centrifugal governor the combination with a driving-shaft of a washer rotated by said shaft, said washer being provided with a number of recesses, a ball in each of said recesses, a second washer mounted loosely on the shaft and adapted to maintain the balls in their recesses, the said second washer being adapted to be displaced longitudinally on the shaft through the balls when they are displaced in their recesses under the action of the centrifugal force, a spring acting on said second washer, a forked lever on which the second washer acts when displaced longitudinally, an axle on which said lever may be oscillated and an arm for transmitting the movement of the second arm to the part to be operated by the governor, substantially as described and for the purpose set forth.

4. In combination the motor-shaft having a gear thereon, a second gear meshing therewith and having ball-receiving pockets in its face with inclined outer walls, balls seated in said pockets, a retaining cap or washer mounted to rotate in proximity to said gear and having an inclined outer flange overlapping the balls, said cap being movable toward and from the gear, and speed-controlling connections connected with said cap, substantially as described.

I witness whereof I have hereunto set my hand in presence of two witnesses.

EUGENE MATHIEU.

Witnesses:
 GEORGE BEDE,
 GREGORY PHELAN.